Jan. 3, 1961 E. GRESSEL 2,967,068
SELF ADJUSTING FULL FLOW PIPE JOINT
Filed June 25, 1957 2 Sheets-Sheet 1
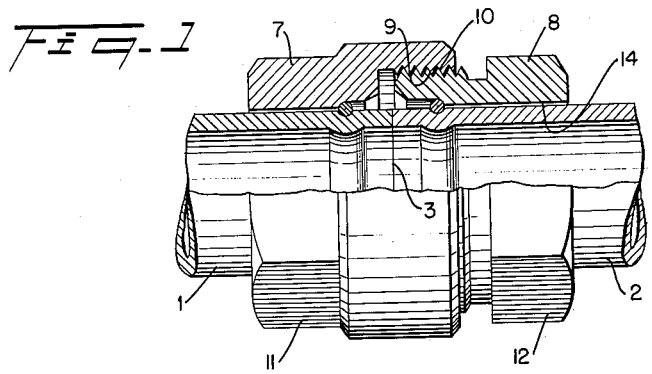
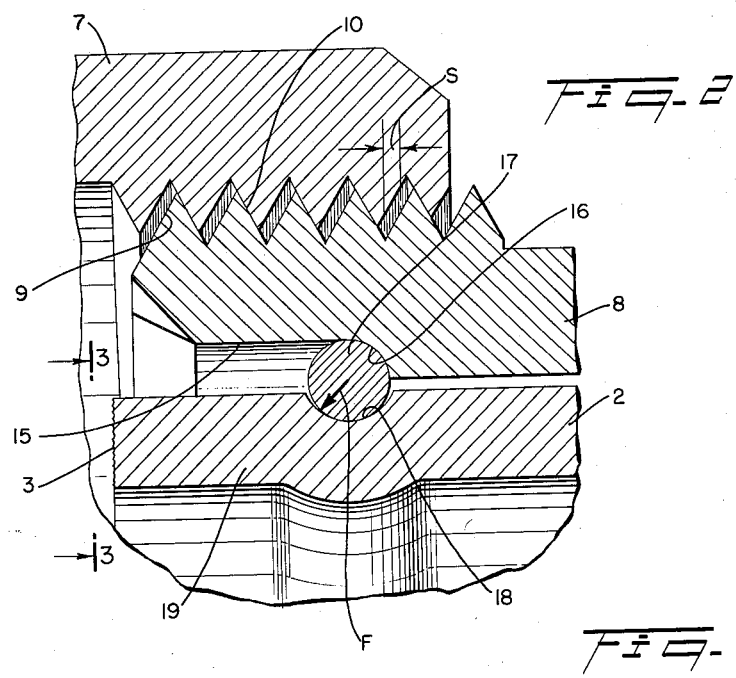
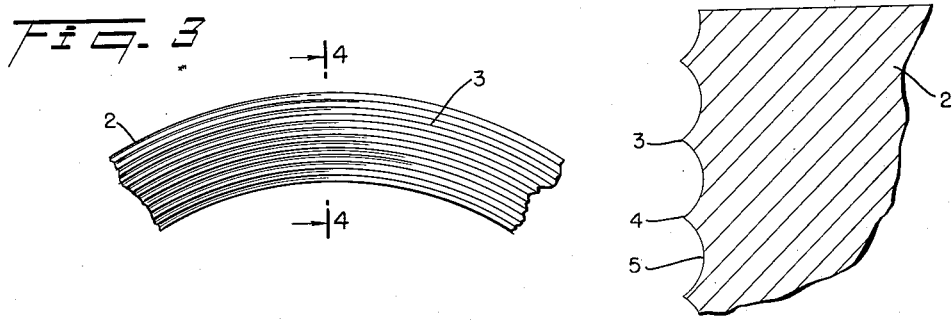

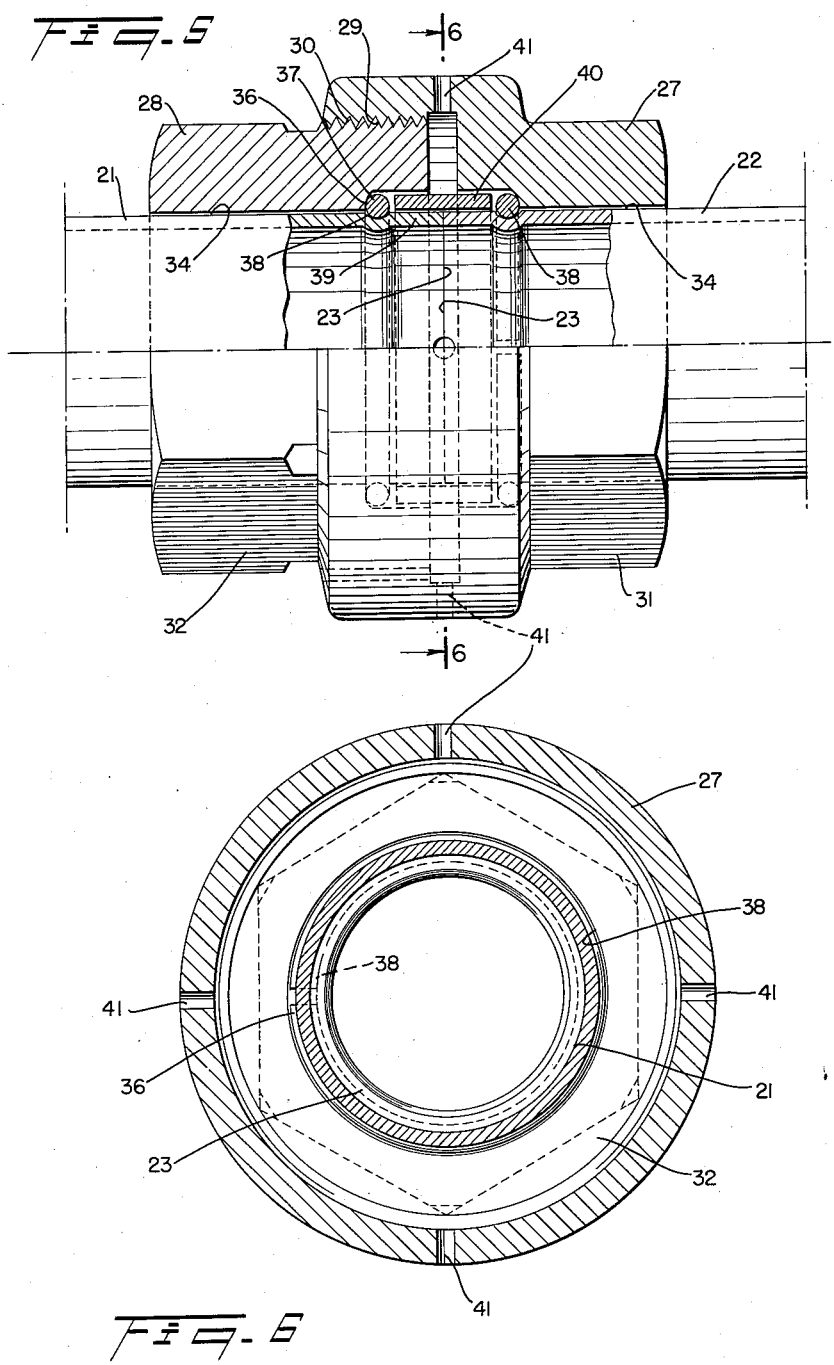

2,967,068
Patented Jan. 3, 1961

United States Patent Office

2,967,068

SELF ADJUSTING FULL FLOW PIPE JOINT

Edmund Gressel, Aadorf, Switzerland, assignor to Maschinenfabrik Edm. Gressel A.G., Aadorf, Switzerland, a Swiss corporation Filed June 25, 1957, Ser. No. 667,942

3 Claims. (Cl. 285—328)

The present invention relates to joining successive sections of pipe in a pipe line. The term "section" is used in a generic sense to include either a length of pipe or a fitting such as an elbow, T or cross. This application is a continuation-in-part of my copending application Serial No. 299,427, filed July 17, 1952 and now abandoned.

Many different types of pipe joints have been used and are satisfactory for some kinds of service. However, each has limitations which render it unsuitable for certain uses. For example, with an ordinary threaded sleeve, there is a space between the ends of successive pipe sections. The material being conducted in the pipe line tends to collect in this space and hence such joints are unsuitable for use in "sanitary" pipe lines, for example those used for food, drug or chemical products. Moreover, a threaded sleeve pipe joint cannot readily be disconnected if it is located at an intermediate point in a pipe line. Unions and other pipe couplings employing gaskets can be easily opened but have the limitation that the rubber or other gasket material may contaminate the fluid for which the pipe line is used or may be attacked by chemical or other materials in the pipe line. The gasket may also be deleteriously affected by the high temperatures to which some pipe lines are subjected. Like pipe joints made with threaded sleeves, gasketed couplings usually have spaces in which material can collect and are hence not sanitary. Welded pipe joints eliminate such space but it requires special equipment to make them and they cannot be disconnected except by cutting the pipe. Moreover, the welds are likely to produce inwardly projecting fins which tend to trap material passing through the pipe line and hence are subject to the same objection as spaces.

It is an object of the present invention to provide a fluid tight pipe joint having the following characteristics:

(1) It can be connected and disconnected easily and repeatedly.

(2) Fluid tightness is obtained without gasket material.

(3) The inner surface of the pipe at the joint is smooth and uninterrupted, without recess or inwardly projecting fins.

(4) The pipe joint is not affected by high operating temperatures or by changes in temperature.

(5) The pipe joint is of simple construction and is reliable and durable.

(6) It is capable of withstanding high pressures for example pressures of the order of 500 pounds per square inch.

Because of these characteristics, pipe joints in accordance with the present invention are particularly suitable for sanitary pipe lines used for food and drug products. They are also suitable for pipe lines handling chemicals, including those of a corrosive nature, and for pipe lines required to operate at high temperatures. The invention is especially applicable to joining sections of thin walled pipe. The term "thin walled" is herein used to designate pipe having a wall thickness that is materially less than that of standard pipe. For example the wall thickness of standard 2″ pipe is 0.154″. Thin wall pipe has a lesser wall thickness, for example 0.065″. While the invention is not limited to particular pipe sizes, its greatest value is at present for joining pipes having a nominal diameter of ½ inch to 2 inches.

The objects, characteristics and advantages of the invention will be more fully understood from the following description and claims in conjunction with the accompanying drawings which illustrate preferred embodiments of the invention and in which:

Fig. 1 is a side view of a pipe coupling in accordance with the invention with portions broken away to show a part of the pipe joint in longitudinal section.

Fig. 2 is a magnified view of a portion of Fig 1 with the left hand pipe section omitted.

Fig. 3 is a fragmentary end view of one of the pipe sections taken approximately on the line 3—3 in Fig. 2.

Fig. 4 is a fragmentary and greatly enlarged section taken approximately on the line 4—4 in Fig. 3.

Fig. 5 is a view similar to Fig. 1 but showing a modification and

Fig. 6 is a cross section taken approximately on the line 6—6 in Fig 5.

A pipe joint in accordance with the invention is shown by way of example in Figs. 1 to 4 joining two pipe sections 1 and 2. While the pipe sections 1 and 2 are illustrated as being the end portions of pipe lengths, either or both may be a fitting such as an elbow, T or cross. The pipe sections are formed of material which is hard and strong but yet sufficiently malleable and resilient as to be deformable without fracturing upon application of sufficient force. For many of the uses in the food, drug and chemical industries, it is also desirable for the pipe sections to be corrosion-resistant. As an example of a suitable material, the pipe sections may be formed of stainless steel containing approximately 18% nickel and 8% chromium. The wall of the pipe is relatively thin in proportion to the pipe size being materially thinner than the wall of standard pipe.

Each of the pipe sections has an end face 3 which lies substantially in a plane perpendicular to the axis of the pipe section and is hence "square." Each of the end faces 3 is accurately finished to obtain a true surface. The finishing is preferably done by a special instrument which fits onto the end of the pipe and has a cutting tool that rotates about the pipe axis and is fed by movement in a radial direction. The feeding of the tool is effected continuously or step-by-step at a selected rate to produce a surface that is smooth and true and has minute ridges 4 separated by valleys 5. The ridges and valleys are spiral when produced by a tool that is fed continuously and are substantially circular with periodic jogs when the tool is fed stepwise. In either event, they are substantially concentric with the axis of the pipe section and hence perpendicular to its radius at any point of the circumference. The ridges and valleys are of such minute size and are so closely spaced that the surface appears smooth and polished with a finish of the order of 16 to 32 microinches. The tool preferably has a rounded cutting end so that the valleys are of arcuate cross section and the sides of the ridges are hence concave as seen in Fig. 4.

In accordance with the invention, the two pipe sections 1 and 2 are abutted end to end in axial alignment and with the specially prepared end face of one section directly engaging the end face of the other and means are provided for exerting axial forces on the pipe sections to press the two end faces tightly together to provide a fluid tight seal without any intervening gasket or other extraneous sealing material. The means for pressing the end faces of the pipe sections together comprise two annular coupling members 7 and 8 which are preferably formed of steel or like material. One of the coupling members 7 is provided with a female threaded portion 9 and the other coupling member 8 has a mating male threaded portion 10 which screws into the female portion with a loose fit to draw the two coupling members toward one another. The threads are of V cross section and are of uniform diameter as distinguished from tapered pipe threads. The coupling members 7 and 8 surround and are affixed to the end portions of the respective pipe sections 1 and 2 so as to transmit axial force from the coupling members to the pipe sections to press the abutting end faces of the sections tightly into engagement with one another when the coupling members are screwed together. At least one of the coupling members is rotatable relative to its pipe section and the members are preferably provided with wrench sections 11 and 12 to facilitate relative rotation of the coupling members. The other coupling member may be welded or otherwise securely affixed to the other pipe section but for sake of simplicity both are shown affixed in the same manner which will be described with reference to the coupling member 8 and pipe section 2.

The coupling member 8 has an axial bore 14 of a size to receive the pipe section 2 with a snug fit which permits free rotation of the coupling member on the pipe section. As pipe of the same nominal size customarily varies in actual outside diameter, the axial bore of the coupling member is large enough to accommodate the largest pipe for which the coupling is intended. The length of the bore is sufficient to assure proper alignment of the pipe sections and is preferably approximately equal to the diameter of the pipe section. At its inner end, the bore 14 is enlarged to provide an annular recess 15 terminating in a shoulder 16 which is approximately quarter-circular in cross section. A split ring 17 of hard material such as spring steel seats in the recess 15 against the shoulder 16. The ring 17 is of circular cross section with a radius approximately equal to the depth of the recess 15 in a radial direction. The split ring 17 also seats in an annular groove 18 formed in the outer surface of the pipe section 2. The groove is of arcuate cross section with a radius approximately equal to that of the ring 17. The depth of the groove 18 is such that the radial distance from the axis of the pipe section to the bottom of the groove 18 is equal to or slightly less than the inside radius of the recess 15 of the coupling member minus the diameter of the ring 17. This distance should be maintained substantially constant despite variation in the outside diameter of the pipe section 2. Hence with maximum size pipe, the depth of the groove 18 as measured from the outer surface of the pipe section will be greater than with minimum size pipe. The maximum depth of the groove 18 is slightly less than the cross sectional radius of the ring 17. The minimum depth should not be less than approximately 0.02 inch. The groove 18 is uniformly spaced from the end face 3 a distance such that the end faces of the two pipe sections 1 and 2 abut one another as shown in Fig. 1 before the male threaded portion of the coupling member 8 is screwed fully into the female threaded portion of the coupling member 7. The distance the groove is spaced from the end face 3 of the pipe section is preferably less than the diameter of the pipe section but sufficient to provide a cylindrical portion 19 of substantial length between the groove and the end face.

The groove 18 is preferably formed in the pipe section 2 by a cold rolling process performed with a special pipe tool having a guide face that abuts the end of the pipe section and disc rollers which form the groove upon rotation of the tool relative to the pipe section. The wall thickness of the pipe section is not reduced materially by formation of the groove. The crystalline lines of the metal are deformed rather than cut by the rolling of the grooves so that the wall is not weakened. Moreover, the rolling operation by which the groove is formed compacts and coldworks the material of the pipe section so as to provide a dense, hard surface.

The method of making a pipe joint in accordance with the present invention comprises the following steps. The end of the pipe is subjected to a finishing operation, for example by means of a special tool as described, in order to provide a square face at approximately right angles to the axis of the pipe. The groove 18 is then rolled in the pipe section using the square end face of the pipe as a reference so that the groove is located a uniform distance from the end face, and the central plane of the groove, i.e. a plane passing through the locus of the cross sectional centers of the groove, is perpendicular to the axis of the pipe. The coupling member 7 or 8 is then slipped onto the pipe beyond the groove 18 and the split ring 17 is snapped into place in the groove 18. The end of the pipe is then refinished to remove any distortion or marring incidental to the grooving and putting the ring in place and to assure a true and square end face having the surface characteristics described above. The ends of the adjacent pipe sections are then brought together in axial alignment and the coupling members 7 and 8 are screwed together to exert opposite axial forces on the two pipe sections to press the end faces into fluid tight engagement with one another.

Although the end faces are theoretically square and the grooves 18 are in theory uniformally spaced from the ends of the pipe sections, it is impossible in practice to obtain absolute perfection. Since there is no gasket material between the end faces of the pipe sections it is essential to assure fluid tight contact between the end faces throughout their circumferential extent despite such imperfections as unavoidably occur. In accordance with the invention, this is assured by the cooperation of the following features:

(1) The male threaded portion 10 of the coupling member 8 screws loosely into the female threaded portion 9 of the coupling member 7 with a "sloppy" fit. By reason of the V-shaped cross section of the threads and the looseness of the fit of the threaded portions, the two coupling members are capable of limited angular movement relative to one another so that the axis of one member can form a slight angle with the axis of the other member even when the threads are fully engaged. If one or both end faces of the pipe sections are not perfectly square, or if the distance between the end face and the groove 18 is not perfectly uniform throughout the circumferential extent of the groove, the sloppiness of the threaded connection between the coupling members permits angular movement of the members relative to one another to compensate for such imperfections and thereby assure the application of substantially uniform pressure throughout the circumferential extent of the end faces. To assure satisfactory pipe joints under field conditions under which the couplings are customarily installed, there should be an axial play of not less than approximately .01 inch as indicated at S in Fig 2.

(2) The relationship of the ring 17 with the recess 15 of the coupling member and the groove 18 of the pipe provides further compensation for minor imperfections. Since the groove 18 has a depth somewhat less than the cross sectional radius of the ring 17 the force transmitted through the ring from the coupling member 8 to the pipe section is inclined as indicated by the arrow F in Fig. 2 and hence has a radial component. If the force at one point in the circumferential extent of the groove is greater than that at the diametrically opposite point—for example because the end face of the pipe is not quite square—the radial components of the forces tend to balance one another either by slight diametrical movement of the pipe relative to the coupling member or by elastic deformation. By reason of the inclined engagement surfaces of the ring and groove, the balancing of the radial components results in like balancing of the axial components so that substantially equal pressure is applied to the end faces throughout their circumferential extent. The surface hardening of the grooves 18 as described above avoids any excessive deformation.

(3) The minute concentric spaced ridges 4 on the end faces of the pipe sections provide a reduced area of initial contact. As pressure between the end faces is increased by screwing the coupling members together, the ridges are progressively flattened. If there are any "high spots" on the end faces of the pipe sections, the ridges on such "high spots" will be flattened to a greater extent than at "low spots." Despite minor imperfections, a fluid tight metal-to-metal contact between the end faces throughout their circumferential extent is assured. Since the ridges run perpendicular to the radius of the pipe section, they do not provide a leak path but on the contrary constitute a multiple baffle or barrier to insure fluid tightness. If the grooves are spiral, the spirals on the interengaging end faces are in opposite direction so that they cross one another and hence block any spiral leakage path.

Another embodiment of the invention is illustrated in Figs. 5 and 6 where corresponding parts are designated by the same reference numerals as in Figs. 1 to 4 with the addition of 20. Two pipe sections 21 and 22 having abutting end faces 23 are joined by cooperating coupling members 27 and 28 having interengaging threaded portions 29 and 30, respectively. The coupling members are provided with wrench sections 31 and 32 to facilitate screwing them together. Each of the coupling members has an axial pipe receiving bore 34 which is enlarged at its inner end to provide an annular recess 35 terminating in a shoulder 36 of arcuate cross section. A split ring 37 seats against the shoulder 36 and also seats in an annular groove 38 formed in the outer surface of the pipe section and spaced from the end face 23. Each of the pipe sections has a cylindrical portion 39 between the groove 38 and the end face of the section. A tubular sleeve 40 fits in the recesses 35 of the coupling members and closely surrounds the end portions 39 of the pipe sections to assist in aligning the pipe sections with one another. One or more radial holes 41 are provided in the coupling member 28 to facilitate detecting leakage if any should occur.

Except as otherwise shown and described, the pipe joint of Figs. 5 and 6 is the same as that of Figs. 1 to 4 and is made up in like manner.

The relationship and proportions of a typical pipe joint in accordance with the invention are illustrated by the following example:

| | Inches |
|---|---|
| Nominal size of pipe | 2 |
| Outside diameter of pipe | 2.375 |
| Wall thickness | .065 |
| Depth of shaping groove | .0375 |
| Cross sectional diameter of ring | .120 |
| Internal diameter of recesses in coupling members | 2.544 |
| Radial depth of recesses in coupling members | .062 |
| Internal diameter of pipe apertures in coupling members | 2.420 |
| Minimum axial thread clearance of coupled parts | .01 |

While preferred embodiments of the invention have been shown by way of example in the drawings and particularly described, it will be understood that the invention is in no way limited to these embodiments and that pipe joints in accordance with the invention may vary as to form and design within the scope of the appended claims.

What I claim and desire to secure by Letters Patent is:

1. A pipe joint for thin wall pipe comprising two pipe sections, each having an end portion of the same diameter as the pipe section and having a square end face, said pipe sections being abutted end-to-end with the end face of one section directly engaging the end face of the other, two coupling members surrounding adjacent end portions of said pipe sections, respectively, one of said members having a male thread of V cross section and the other of said members having a mating female thread engageable with said male thread to screw said members together, means affixing said members to the respective pipe sections to transmit axial force from said members to said sections to press the abutting end faces of said sections tightly together when said members are screwed together, at least one of said members being rotatable on its respective pipe section and having an axial bore receiving said pipe section and an annular recess coaxial with said bore and extending axially from the inner face of the inner end face of said member, said recess terminating in a radially extending shoulder and the corresponding pipe section having formed in its outer surface a circumferential groove of arcuate cross section uniformly spaced from the end face of the pipe section a distance less than the diameter of the pipe section, the affixing means for said rotatable member comprising a split ring of circular cross section seated in said groove and recess and engaging said shoulder, each of said end faces having a surface that is substantially smooth but has minute spaced ridges separated by intervening valleys, said ridges and valleys being substantially concentric with the axis of said sections and said ridges being sufficiently small to be at least partially flattened by the pressure between said end faces applied by said members when screwed together to assure a fluid tight joint without requiring excessive pressure between said faces.

2. A sanitary pipe joint for thin wall pipe comprising two pipe sections of uniform diameter, each having an unthreaded end portion with a square end face, said pipe sections being abutted end-to-end with the end face of one section directly engaging the end face of the other, two coupling members surrounding adjacent end portions of said pipe sections, respectively, one of said members having a threaded portion of larger diameter than said pipe sections with a male thread of V cross section and the other of said members having a mating female thread engageable with said male thread to screw said members together, means affixing said members to the respective pipe sections to transmit axial force from said members to said sections to press the abutting end faces of said sections tightly together when said members are screwed together, each of said end faces having a surface that is substantially smooth but having minute spaced ridges separated by intervening valleys, said ridges and valleys being substantially concentric with the axis of said sections and said ridges being sufficiently small to be at least partially flattened by the pressure between said end faces applied by said members when screwed together to assure a fluid tight joint without requiring excessive pressure between said faces, at least one of said members being rotatable on its respective pipe section and having an axial bore receiving said pipe section and an annular recess coaxial with said bore and extending axially from the inner face of the inner end of said member to said bore, the diameter of said bore being slightly greater than the outer diameter of the pipe sections and the diameter of said recess being substantially larger than that of said bore, said recess terminating in a radially extending shoulder and the corresponding pipe section having formed in its outer surface a circumferential groove of arcuate cross section uniformly spaced from the end face of the pipe section a distance less than the diameter of the pipe section, the affixing means for said rotatable member comprising a split ring of circular cross section seated in said groove and recess and engaging said shoulder, said threads being of uniform diameter and the male threads of said one member fitting loosely in the female threads of said other member with an axial play of a least .01 inch, said play permitting limited angular movement between said members to compensate for any slight deviation in the squareness of the end faces of said pipe sections or in the distance of said groove from the respective end face and thereby assure substantially equal pressure between said end faces throughout their circumferential extent when said members are screwed together, whereby the inner surfaces of said pipe sections are joined to form a smoothly continuous passageway that passes all the piped material.

3. A sanitary pipe joint for thin wall pipe comprising two pipe sections of uniform diameter, each having an unthreaded end portion with a square end face, said pipe sections being abutted end-to-end with the end face of one section directly engaging the end face of the other, two coupling members surrounding adjacent end portions of said pipe sections respectively, one of said members having a threaded portion of larger diameter than said pipe sections with a male thread of V cross section and the other of said members having a mating female thread engageable with said male thread to screw said members together, means affixing said members to the respective pipe sections to transmit axial force from said members to said sections to press the abutting end faces of said sections tightly together when said members are screwed together, each of said end faces having a surface that is substantially smooth but having minute spaced ridges in the order of 16 to 32 micro-inches in height separated by intervening valleys, said ridges and valleys being substantially concentric with the axis of said sections and said ridges being sufficiently small to be at least partially flattened by the pressure between said end faces applied by said members when screwed together to assure a fluid tight joint without requiring excessive pressure between said faces, at least one of said members being rotatable on its respective pipe section and having an axial bore receiving said pipe section and an annular recess coaxial with said bore and extending axially from the inner face of the inner end of said member to said bore, the diameter of said bore being slightly greater than the outer diameter of the pipe sections and the diameter of said recess being substantially larger than that of said bore, said recess terminating in a radially extending shoulder and the corresponding pipe section having formed in its outer surface a circumferential groove of arcuate cross section uniformly spaced from the end face of the pipe section a distance less than the diameter of the pipe section, the affixing means for said rotatable member comprising a split ring of circular cross section seated in said groove and recess and engaging said shoulder, said threads being of uniform diameter and the male threads of said one member fitting loosely in the female threads of said other member with an axial play of at least .01 inch, said play permitting limited angular movement between said members to compensate for any slight deviation in the squareness of the end faces of said pipe sections or in the distance of said groove from the respective end face and thereby assure substantially equal pressure between said end faces throughout their circumferential extent when said members are screwed together, whereby the inner surfaces of said pipe sections are joined to form a smoothly continuous passageway that passes all the piped material.

References Cited in the file of this patent

UNITED STATES PATENTS

| | | |
|---|---|---|
| 473,462 | Hogan | Apr. 26, 1892 |
| 1,057,763 | Mueller et al. | Apr. 1, 1913 |
| 1,301,453 | Kendall | Apr. 22, 1919 |
| 1,348,667 | Snyder | Aug. 3, 1920 |
| 1,703,696 | Stratford | Feb. 26, 1929 |
| 1,935,673 | Smith et al. | Nov. 21, 1933 |
| 1,992,793 | Welter | Feb. 26, 1935 |
| 2,136,036 | Avery | Nov. 8, 1938 |
| 2,204,754 | Frame | June 18, 1940 |
| 2,230,116 | Kreidel | Jan. 28, 1941 |
| 2,310,490 | Melsom | Feb. 9, 1943 |
| 2,320,107 | Speckert | May 25, 1943 |
| 2,347,469 | Dies | Apr. 25, 1944 |
| 2,535,694 | Payne | Dec. 26, 1950 |

FOREIGN PATENTS

| | | |
|---|---|---|
| 285,164 | France | Jan. 21, 1899 |
| 195,347 | Canada | Mar. 30, 1918 |

OTHER REFERENCES

The Story of Superfinish, page 278, by A. M. Swigert, Jr. Lynn Publishing Co., Detroit, Michigan.